R. E. CARPENTER.
AUTOMOBILE BRACE.
APPLICATION FILED MAY 23, 1914.
1,118,529.
Patented Nov. 24, 1914.
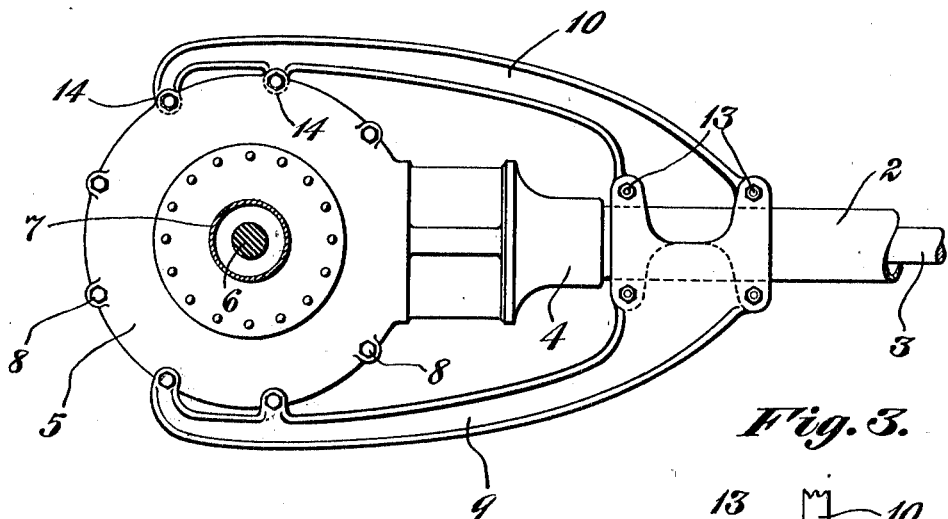
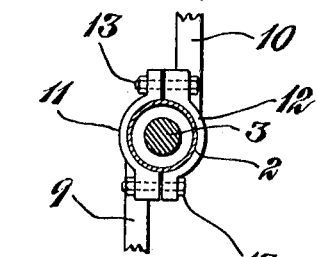
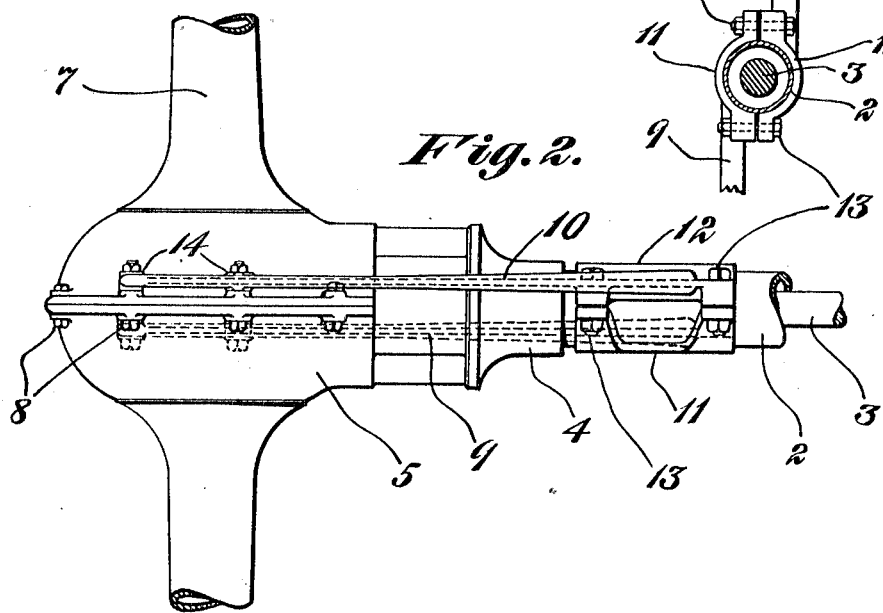
Witnesses:
L. L. Markel
John P. Fitzsimmons
Inventor:
R. E. Carpenter
By his Attorneys,
Sutherland & Anderson

UNITED STATES PATENT OFFICE.

RALPH E. CARPENTER, OF HARTFORD, CONNECTICUT.

AUTOMOBILE-BRACE.

1,118,529.  Specification of Letters Patent.  Patented Nov. 24, 1914.

Application filed May 23, 1914. Serial No. 840,476.

*To all whom it may concern:*

Be it known that I, RALPH E. CARPENTER, a citizen of the United States, residing at Hartford, in the county of Hartford and State of Connecticut, have invented certain new and useful Improvements in Automobile-Braces, of which the following is a specification.

This invention relates to automobile braces, the object of the invention being to provide a simple article of this character, which is light, yet thoroughly strong and which is to prevent breakage at a certain joint or within a certain area which is subjected in action to undue strain.

At the present time there is an automobile on the market which has a large sale. This car comprises a housing for the rear axle and a housing for the main shaft connected with the rear axle by differential gearing inclosed in a case constituting part of the rear axle. Said main shaft housing is connected with the casing generally through the intervention of a coupling-sleeve, and it is a matter of fact that it is a common occurrence that the main shaft housing is broken at or near where it unites with this sleeve. Not only does this happen, but at the same time certain of the power-transmitting parts are frequently ruined beyond repair on such breakage.

It is my purpose to materially strengthen the automobile at and around the place mentioned, so as to eliminate as nearly as possible accidents of the character noted.

In the drawings accompanying and forming part of the present specification I have shown in detail one of the several convenient forms of embodiment of the invention, which to enable those skilled in the art to practise the same, will be set forth fully in the following description. I do not restrict myself to this showing; I may depart therefrom in several respects within the scope of the invention defined by the claims following said description.

Referring to said drawings: Figure 1 is a side elevation of portion of the main shaft housing, rear axle housing differential-gear casing and certain coöperating parts of an automobile provided with a brace device involving my invention, the axle and its housing being shown in section. Fig. 2 is a top plan view of the same. Fig. 3 is a cross section on the line 3—3 of Fig. 1.

Like characters refer to like parts throughout the several figures.

The numeral 2 denotes the housing for the main shaft of an automobile of known construction, the main shaft being designated by 3. This housing 2 is tapped at its rear into the coupling sleeve 4 connected with the casing 5 which incloses the differential gear between the main shaft 3 and axle 6, the housing for the axle being denoted by 7 and being constructed of duplicate sections with each of which a half of the differential gear casing 5 is connected. The two parts of the casing 5 are usually united by several bolts 8.

The foregoing is a brief description of a portion of a well-known type of automobile, and as I have already observed, it is a very frequent occurrence for the housing 2 to break at or near where it is united with the sleeve 4, a variety of things causing such accident. The primary purpose of the brace constituting the subject matter of the present case is to prevent as far as possible such occurrences.

The brace illustrated comprises two arms 9 and 10 best made by casting, the arm 9 having at its inner or forward end a half sleeve 11, while the arm 10 has a similar half sleeve 12, the two half sleeves mating and being adapted to receive jointly the rear terminal portion of the main shaft housing 2 at or near where it unites with the sleeve 4 and presenting a convenient clamp for such purpose. These two half sleeves can be maintained in clamping or fixed relation with the housing 2 in any desirable manner, for instance by bolts as 13, there being as illustrated four of such bolts, two below the housing 2 and the other two above the housing. This is merely an illustration, as will be clear. It will be, of course, understood that the half sleeves 11 and 12 have openings, such as perforations, adapted to register to receive the several bolts 13. The bodies or main portions of the arms 9 and 10 are curved or bound, the curve of the lower arm being downward, while that of the upper arm is upward. The arms have at their outer ends openings which may also be in the form of perforations, to receive certain of the bolts 8, each arm having in the present case two of such openings which can be conveniently formed in lugs as 14 extending inward therefrom, each arm as represented being provided with two of such lugs, so that in the construction shown each arm is adapted to receive at its rear end two of the bolts 8.

It becomes a simple and easy matter to mount the brace. To accomplish this the necessary bolts 8 can be taken from place after which the half sleeves 11 and 12 can be fitted to the housing 2 just forward of the sleeve 4 following which the bolts 13 will be applied and their nuts set, the openings or perforations in the lugs 14 having in the meantime been placed in coincidence with the appropriate holes or perforations of the casing 5, from which the bolts 8 have been taken. When the nuts of the bolts 13 are set, the bolts 8 will be reapplied and their nuts set to thus rigidly connect the two brace arms 9 and 10 with the housing 2 and the casing 5. As illustrated the arms 9 and 10 are interchangeable which is in itself a feature of advantage and this can be secured by making them of duplicate construction, so that in case one arm should be broken, it is not necessary to get a new set. I find in practice that the members so effectually reinforces and strengthens the structure where the housing 2 unites with the sleeve 4, that it is practically impossible to break the housing 2 at the point mentioned. It will be observed that although the two arms are superposed by which relation the best effects are obtained, they are not exactly vertically alined, although there might be cases where they may be. They receive the extreme thrusts to which the joint between the housing 2 and sleeve 4 is subjected, and effectually resist such thrusts and strains.

What I claim is:

1. An automobile brace of the class set forth comprising two separate oppositely bowed arms of duplicate construction provided with half sleeves at their inner ends which mate to present a clamp, the outer ends of the arms having bolt receiving perforations.

2. An automobile brace of the class set forth comprising separate oppositely bowed arms of duplicate construction provided with half sleeves at their inner ends which mate to present a clamp and which have openings to receive fastening means, the outer ends of the arms being provided with projections having bolt receiving perforations, and the arms when in operative position being vertically out of line with each other.

In testimony whereof I affix my signature in presence of two witnesses.

RALPH E. CARPENTER.

Witnesses:
HEATH SUTHERLAND,
F. E. ANDERSON.